US007872221B2

(12) United States Patent
Blevis et al.

(10) Patent No.: US 7,872,221 B2
(45) Date of Patent: Jan. 18, 2011

(54) APPARATUS AND METHODS FOR CALIBRATING PIXELATED DETECTORS

(75) Inventors: Ira Blevis, Zichron Yaakov (IL); Leonid Tsukerman, Q. Mozkin (IL)

(73) Assignee: General Electric Company, Schenectady, NY (US)

( * ) Notice: Subject to any disclaimer, the term of this patent is extended or adjusted under 35 U.S.C. 154(b) by 85 days.

(21) Appl. No.: 12/363,432

(22) Filed: Jan. 30, 2009

(65) Prior Publication Data

US 2010/0193696 A1 Aug. 5, 2010

(51) Int. Cl.
*G01D 18/00* (2006.01)
*G12B 13/00* (2006.01)

(52) U.S. Cl. .................................................. 250/252.1

(58) Field of Classification Search ............... 250/252.1
See application file for complete search history.

(56) References Cited

U.S. PATENT DOCUMENTS 7,030,378 B2 4/2006 Allen et al.
7,344,307 B2 3/2008 Yatsenko et al.
2007/0086071 A1 4/2007 Gila et al.
2007/0145257 A1* 6/2007 Petrillo et al. ............ 250/252.1
2007/0173792 A1 7/2007 Arnoldussen

FOREIGN PATENT DOCUMENTS

EP 1 064 880 A1 1/2001

* cited by examiner

*Primary Examiner*—David P Porta
*Assistant Examiner*—Mark R Gaworecki
(74) *Attorney, Agent, or Firm*—Dean Small; Small Patent Law Group

(57) ABSTRACT

An apparatus and methods for calibrating pixelated detectors are provided. A method includes acquiring energy response data for a plurality of pixels of the pixelated semiconductor radiation detector and performing at least one of energy calibration and sensitivity calibration on each of the plurality of pixels based on the acquired energy response data.

24 Claims, 6 Drawing Sheets

APPARATUS AND METHODS FOR CALIBRATING PIXELATED DETECTORS

BACKGROUND OF THE INVENTION

This invention relates generally to imaging systems, and more particularly, to nuclear medicine imaging systems having pixelated detectors.

Nuclear medicine imaging systems, for example, Single Photon Emission Computed Tomography (SPECT) and Positron Emission Tomography (PET) imaging systems, use several image detectors, such as one, two or three detectors, to acquire imaging data, such as gamma ray or photon imaging data. The image detectors may be, for example, gamma cameras that acquire two-dimensional views of three-dimensional distributions of radionuclides emitted from an object (e.g., a patient) being imaged. The image detectors may be rotated about a patient to acquire a plurality of two-dimensional images (also referred to as projections) to create a multi-dimensional image of a structure of interest or photons transmitted through the object. A non rotating plurality of detectors may also be used to acquire the plurality of planar images as well. The rotating nuclear medicine systems are referred to as single photon emission computed tomography (SPECT) imaging systems. In SPECT systems, 40, 60 or more projections may be acquired, which are then reconstructed to generate a three-dimensional dataset. Backprojection and iterative reconstruction algorithms known in the art may then use information about the physical construction and properties of the imaging system to reconstruct the dataset into three-dimensional and/or four-dimensional representations. The three-dimensional or four-dimensional dataset then may be used to show different slices along or regions within the dataset and display the results as an image similar to images obtained from other tomographic imaging scans, such as, magnetic resonance imaging (MRI) and computed-tomography (CT) scans.

Gamma cameras for detecting photons for SPECT, PET, etc. may be fabricated from semiconductor materials, such as cadmium zinc telluride (CdZnTe), often referred to as CZT, cadmium telluride (CdTe), gallium arsenide (GaAs) and silicon (Si), among others. These semiconductor gamma cameras or semiconductor radiation detectors typically include arrays of pixelated detectors or detector modules. The response of these semiconductor radiation detectors to radiation is a localized current pulse that is detected by localized electronic circuits. These localized electronic circuits are often provided as Application Specific Integrated Circuits (ASICs) attached to and combined with the semiconductor radiation detectors in an imaging module.

These semiconductor radiation detectors suffer from different problems. In particular, one problem is the variations in both the semiconductor radiation detectors and the ASIC response from position to position in the imaging plane. The response constitutes both the size of the electrical pulse for radiation of a given energy, as well as the probability of giving a response of that size. The variations degrade image quality by giving an uneven background in the image against which physicians attempt to detect subtle features. This image degradation makes it difficult, sometimes impossible, to detect these subtle features. Further, these variations can also constitute a lack of energy resolution for the incident radiation and prevent applications where two isotopes are measured at the same time, with one isotope causing energy down-scatter in the spectrum and overlapping the energy region of the second isotope. Another problem with these semiconductor radiation detectors or attached electronics (e.g., ASIC) is the non-linearity (non-proportionality) in the response to different energies of incident flux. Still another problem with these semiconductor radiation detectors is the unresponsiveness of various pixels due to different causes, which results in pixels that are not operating properly.

Thus, in semiconductor radiation detectors, such as pixelated semiconductor gamma cameras, problems exist as a result of the response variation on individual crystal domains and different instances of the electronics readout, the non-linear response to the energy of the incident radiation flux, and slow variations of these parameters in time.

BRIEF DESCRIPTION OF THE INVENTION

In accordance with an embodiment of the invention, a method for calibrating a pixelated semiconductor radiation detector is provided. The method includes acquiring energy response data for a plurality of pixels of the pixelated semiconductor radiation detector and performing at least one of energy calibration and sensitivity calibration on each of the plurality of pixels based on the acquired energy response data. Optionally, bad pixel marking or interpolation may be performed.

In accordance with another embodiment of the invention, a machine readable medium or media having recorded thereon instructions configured to instruct an apparatus comprising a computer or processor, memory, and a display is provided. The instructions are configured to instruct the apparatus to acquire energy response data for a plurality of pixels of a pixelated semiconductor radiation detector and perform at least one of energy calibration and sensitivity calibration on each of the plurality of pixels based on the acquired energy response data. Optionally, bad pixel marking or interpolation may be performed.

In accordance with yet another embodiment of the invention, a diagnostic imaging system is provided. The diagnostic imaging system includes at least one pixelated detector including a plurality of pixels and configured to acquire photon data and a calibration processor configured to acquire energy response data for a plurality of pixels of the pixelated semiconductor radiation detector. The calibration processor is further configured to perform at least one of energy calibration and sensitivity calibration on each of the plurality of pixels based on the acquired energy response data. Optionally, bad pixel marking or interpolation may be performed.

DETAILED DESCRIPTION OF THE INVENTION

Figure 1:
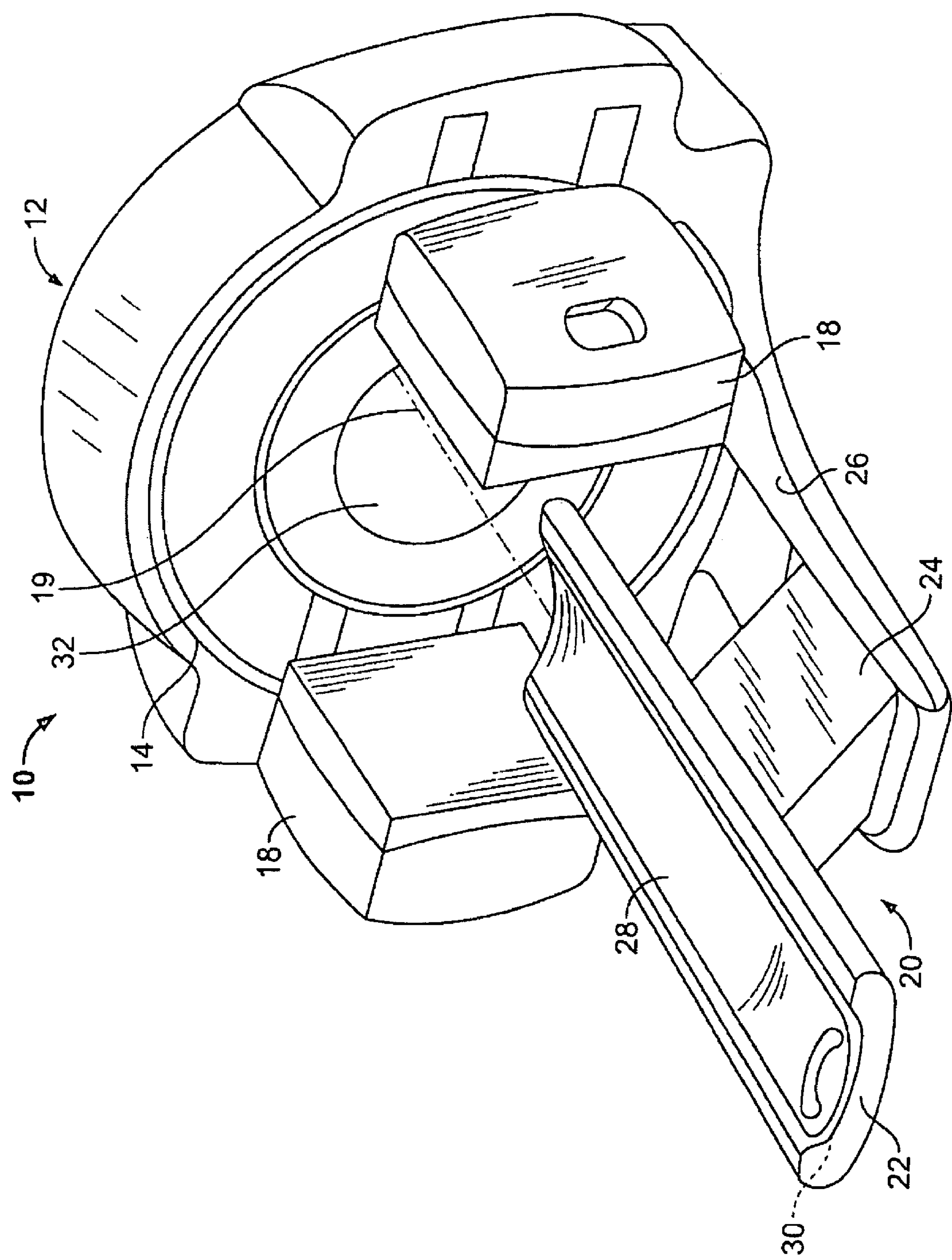
FIG. 1 is a perspective view of an exemplary nuclear medicine imaging system constructed in accordance with an embodiment of the invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word “a” or “an” should be understood as not excluding plural of said elements or steps, unless such exclusion is explicitly stated. Furthermore, references to “one embodiment” of the present invention are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

Various embodiments of the invention provide diagnostic imaging systems with imaging detectors and methods for calibrating pixelated semiconductor imaging detectors. More particularly, the various embodiments measure the response to predetermined inputs and correct the data acquired at the time of imaging to remove image non-uniformities caused by the detector system. The methods of the various embodiments provide corrections for possible energy scale offsets and possible non-linear energy (E) responses that are performed on a pixel by pixel basis that corresponds to hardware pixels. Accordingly, corrections are provided for the variation in local sensitivity caused by energy scale offsets and non-linear E responses. Additionally, for variations in time (e.g., occurring over days or weeks), monitoring of image independent features in the response are provided.

It should be noted that although the various embodiments are described in connection with nuclear medicine imaging systems having particular components, including specific pixelated detectors, the various embodiments are not limited to nuclear medicine imaging systems or to specific pixelated detectors. Accordingly, the various embodiments may be implemented in connection with any type of diagnostic imaging system, for example, medical diagnostic imaging system (e.g., computed tomography system), non-destructive testing system, security monitoring system (e.g., air baggage or airport security imaging system), etc.

FIG. 1 is a perspective view of an exemplary embodiment of a medical imaging system 10 constructed in accordance with various embodiments of the invention, which in this embodiment is a nuclear medicine imaging system, and more particularly, a single photon emission computed tomography (SPECT) imaging system. The system 10 includes an integrated gantry 12 that further includes a rotor 14 oriented about a gantry central bore 32. The rotor 14 is configured to support one or more nuclear medicine (NM) cameras 18 (two cameras 18 are shown), such as, but not limited to gamma cameras, SPECT detectors, multi-layer pixelated cameras (e.g., Compton camera) and/or PET detectors. It should be noted that when the medical imaging system 10 is includes a CT camera or an x-ray camera, the medical imaging system 10 also includes an x-ray tube (not shown) for emitting x-ray radiation towards the detectors. In various embodiments, the cameras 18 are formed from pixelated detectors as described in more detail below. The rotors 14 are further configured to rotate axially about an examination axis 19.

A patient table 20 may include a bed 22 slidingly coupled to a bed support system 24, which may be coupled directly to a floor or may be coupled to the gantry 12 through a base 26 coupled to the gantry 12. The bed 22 may include a stretcher 28 slidingly coupled to an upper surface 30 of the bed 22. The patient table 20 is configured to facilitate ingress and egress of a patient (not shown) into an examination position that is substantially aligned with examination axis 19. During an imaging scan, the patient table 20 may be controlled to move the bed 22 and/or stretcher 28 axially into and out of a bore 32. The operation and control of the imaging system 10 may be performed in any manner known in the art.

It should be noted that the various embodiments may be implemented in connection with imaging systems that include rotating gantries or stationary gantries.

Figure 2:
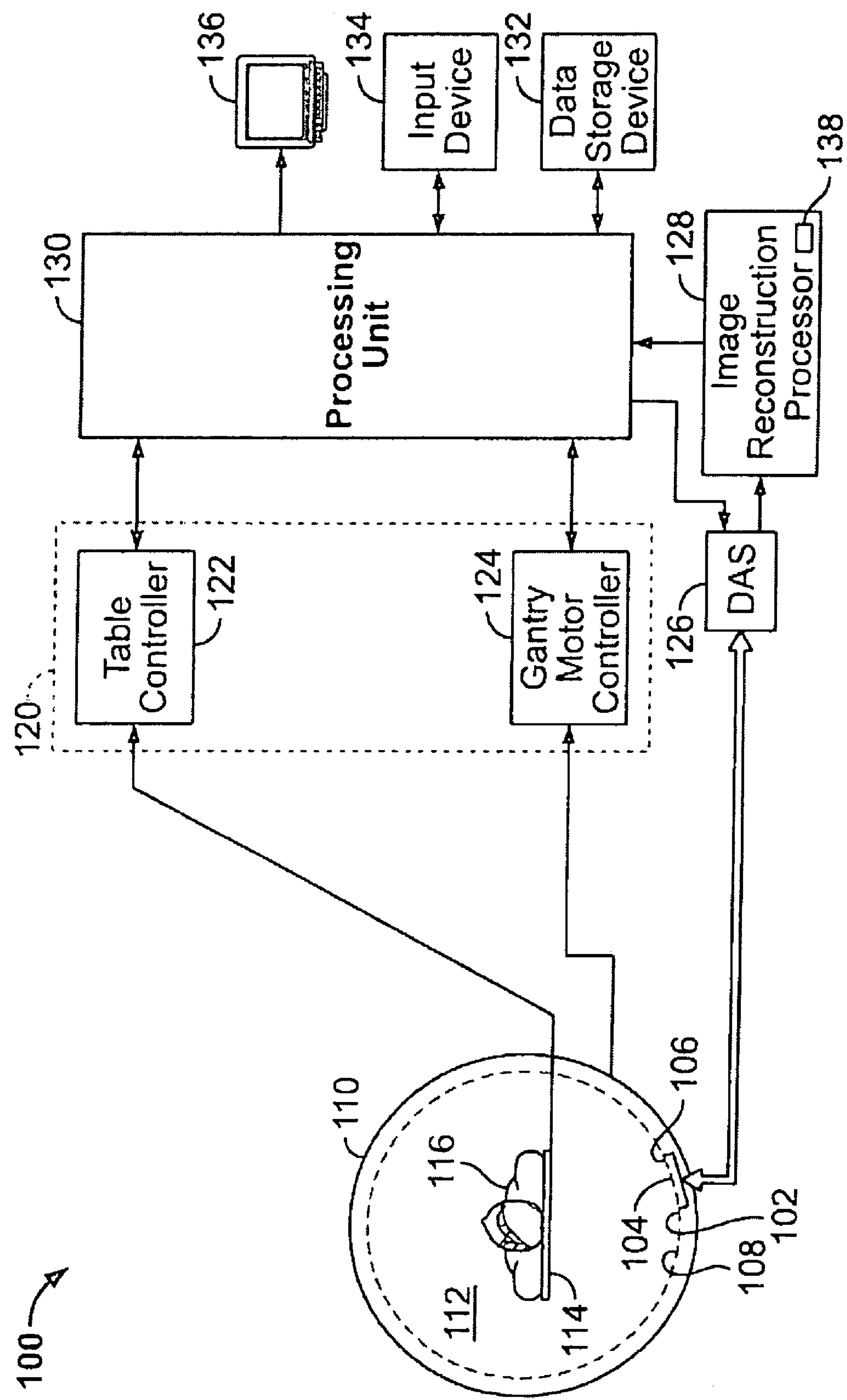
FIG. 2 is a schematic illustration of an exemplary nuclear medicine imaging system constructed in accordance with another embodiment of the invention.

FIG. 2 is a schematic illustration of an NM imaging system 100 that has a plurality of imaging detectors mounted on a gantry. In various embodiments, more than two imaging detectors are provided and are dimensionally smaller than the cameras 18 of the system 10 of FIG. 1. In FIG. 2, and for example, first, second, third through N imaging detectors 102, 104, 106 and 108 are mounted on a gantry 110. The cameras 18 of the system 10 are large enough to image most or all of a width of a patient's body at one time and may have a diameter of approximately 40 centimeters (cm) or more. Each of the first, second, third through N imaging detectors 102, 104, 106 and 108 are smaller than the cameras 18. Each of the first through N imaging detectors 102-108 may have dimensions of, for example, 4 cm to 20 cm and may be formed of cadmium zinc telluride (CZT) tiles to define pixelated detectors as described in more detail below. The first through N imaging detectors 102-108 may be different sizes and/or shapes with respect to each other, such as square, rectangular, circular or other shapes. By positioning multiple imaging detectors at multiple positions with respect to a patient 116, radiation or imaging data specific to a structure of interest within the patient 116 may be acquired without moving the imaging detectors relative to the patient 116.

Each of the first through N imaging detectors 102-108 (which may be separate modules) may include a 2D array of M×N pixels, for example, 32×32 pixels. Each of the detectors 102-108 in one embodiment are stationary, viewing the structure of interest from one particular direction. However, the detectors 102-108 also may rotate about the gantry 110. Optionally, the detectors 102-108 are stationary and one or more collimators (not shown and as are known in the art) are rotated in front of one or more of the detectors 102-108. The collimators also may be stationary relative to the detectors 102-108. Each detector captures a 2D image that may be defined by the x and y location of the pixel and the detector number. Further, in other exemplary embodiments, some or all of the plurality of detectors 102-108 may change orientation relative to a stationary or movable gantry.

Each of the first through N imaging detectors 102-108 has a radiation detection face (not shown) that is directed towards, for example, a structure of interest within the object 116, such as a patient or animal. One or more of the radiation detection faces are covered by a collimator (not shown) as described above. Different types of collimators as known in the art may be used, such as pinhole, fan-beam, cone-beam, diverging and parallel-beam type collimators. An actual field of view (FOV) of each of the first through N imaging detectors 102-108 may be directly proportional to the size and shape of the respective imaging detector 102-108, or may be changed using a collimator.

The gantry 110 may have a bore 112 therethrough. A patient table 114 is configured with a support mechanism (not shown) to support and carry the patient 116, optionally, in a plurality of viewing positions within the bore 112 and relative to the first through N imaging detectors 102-108. Alternatively, the gantry 110 may include a plurality of gantry segments (not shown), each of which may independently move one imaging detector or a subset of imaging detectors. The gantry 110 also may be configured in other shapes, for example, as a "C" or "L", and may be rotatable about the patient 116.

In one embodiment of the imaging system 100, N equals 27, and thus there are 27 imaging detectors arranged in a ring on the gantry 110 around a patient 116. It should be understood that there may be more or less than 27 imaging detectors, and that the imaging detectors may be arranged in an arc, in more than one circle or ring, or in other configurations. By way of example, the 27 imaging detectors may be arranged in three C-shaped arches (not shown) of 9 imaging detectors each. Each of the first through N imaging detectors 102-108 in one embodiment is approximately 8×8 cm in size and includes a corresponding single pinhole collimator (not shown). The assembly of the first through N imaging detectors 102-108 thus forms an arch of approximately 30 cm of axial width (allowing for gaps between the first through N imaging detectors 102-108 as well as radiation shielding), and spans just over 180 degrees about the patient 116. Optionally, the arch may not be configured as a section of a circle, but instead constructed to fit to the shape of a typical patient or the particular patient 116. Optionally, the arch may be stationary and fixed to a stationary gantry 110. The location of the pinholes of the pinhole collimators relative to the sensitive area of the imaging detectors 102-108 may be arranged such that the FOV of all the first through N imaging detectors 102-108 is overlapped or partially overlapped, axially and or trans-axially on a relatively small volume where the organ to be imaged is located. For example, the organ may be the patient's heart, and the patient 116 is moved to the correct position by moving the patient table 114.

A controller unit 120 may control the movement and positioning of the patient table 114, the gantry 110 and/or the first through N imaging detectors 102-108 with respect to each other to position the desired anatomy of the patient 116 within the FOVs of the first through N imaging detectors 102-108 prior to acquiring an image of the anatomy of interest. The controller unit 120 may have a table controller 122 and gantry motor controller 124 that may be automatically commanded by a processing unit 130, manually controlled by an operator, or a combination thereof. The gantry motor controller 124 may move the first through N imaging detectors 102-108 with respect to the patient 116 individually, in segments or simultaneously in a fixed relationship to one another. The table controller 122 may move the patient table 114 to position the patient 116 relative to the FOV of one or more of the first through N imaging detectors 102-108. Optionally, one or more collimators (not shown) may be moved relative to the first through N imaging detectors 102-108. The various embodiments also may be used of the object 116 moves relative to the collimators and/or detector (system).

The first through N imaging detectors 102-108, gantry 110, and patient table 114 remain stationary after being initially positioned, and imaging data is acquired and processed as discussed below. The imaging data may be combined and reconstructed into a composite image, which may comprise two-dimensional (2D) images, a three-dimensional (3D) volume or a 3D volume over time (4D).

A Data Acquisition System (DAS) 126 receives analog and/or digital electrical signal data produced by the first through N imaging detectors 102-108 and decodes the data for subsequent processing. An image reconstruction processor 128 receives the data from the DAS 126 and reconstructs an image using any reconstruction process known in the art. A data storage device 132 may be provided to store data from the DAS 126 or reconstructed image data. An input device 134 also may be provided to receive user inputs and a display 136 may be provided to display reconstructed images.

The NM imaging system 100 also includes a calibration processor 138 that uses acquired image data to calibrate any one of or all of the first through N imaging detectors 102-108 (on a pixel by pixel basis) as described in more detail below. For example, the various embodiments may provide at least one of energy calibration and sensitivity calibration, as well as bad pixel marking or interpolation on a pixel by pixel basis for the first through N imaging detectors 102-108.

Figure 3:
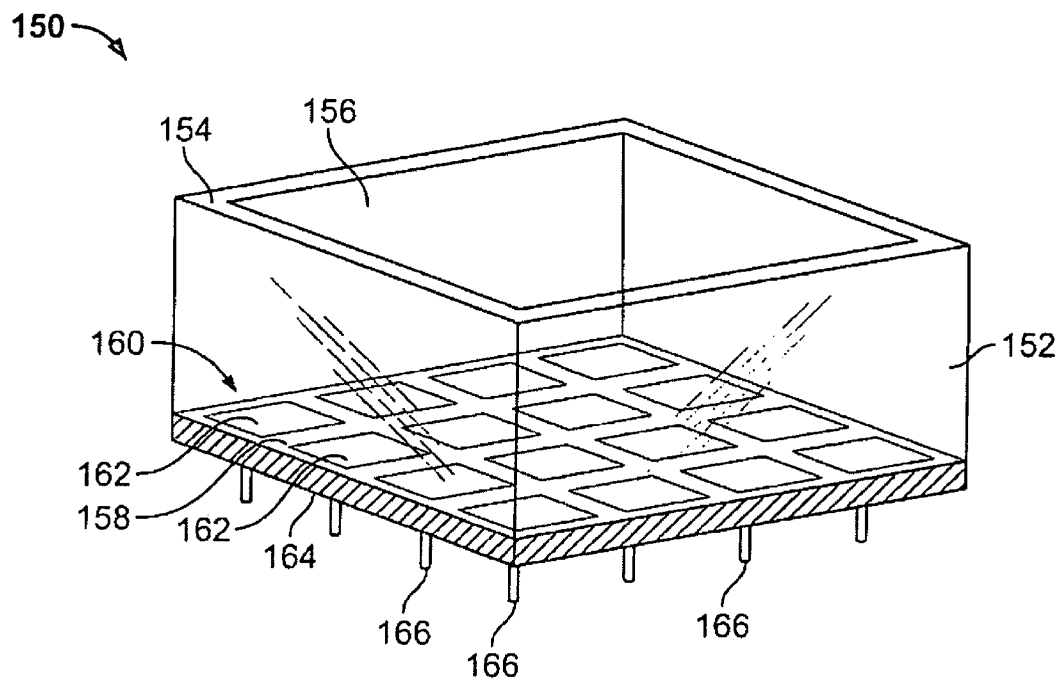
FIG. 3 is a top perspective view of a pixelated photon detector in connection with which various embodiments of the invention may be implemented.

In various embodiments, the cameras 18 and the first through N imaging detectors 102-108 are formed from pixelated photon detectors. For example, and as shown in FIG. 3, one ore more pixelated semiconductor photon detectors 150 may be provided. The pixelated detectors 150 may be formed of any semiconductor material as known in the art, for example, cadmium zinc telluride (CdZnTe), often referred to as CZT, gallium arsenide (GaAs) and silicon (Si), among others. Specifically, the pixelated detectors 150 include a crystal 152 formed from the semiconductor material. A face 154 of the crystal 152 includes a single cathode electrode 156. An opposite face 158 of the crystal 152 includes an anode 160 having a rectangular (e.g., square) array of anode pixels 162. The anode pixels 162 may be of substantially the same size and also may be rectangular in shape. The size of the anode pixels 162 varies, for example, between 1 $mm^2$ and 4 $mm^2$. Also, the number of anode pixels 162 may be greater or smaller than the sixteen shown, for example, thirty-two anode pixels 162 may be provided. It also should be noted that the thickness of the crystal 152 may vary between several millimeters to several centimeters. In operation, and as is known, a voltage difference is applied between the cathode electrode 156 and the anode 160 to generate an electric field in the crystal 152.

In operation, when a photon having energy typical of the energies of photons used in SPECT, CT or PET applications is incident on the crystal 152, the photon generally interacts with the crystal 152 and pairs of mobile electrons and holes in a small localized region of the crystal 152 are generated through a secondary ionization process. As a result of the applied electrical field, the holes drift to cathode 156 and the electrons drift to anode 160, thereby inducing charges on the anode pixels 162 and the cathode 156. The induced charges on anode pixels 162 are sensed and may be partially preprocessed by appropriate electronic circuits (e.g., ASICs) within a detector base 164 and on which the pixelated detector 150 is mounted. For example, a plurality of channels forming a readout amplifier chain may be provided. The detector base 164 includes connection members, for example, connection pins 166 for mounting to, for example, a motherboard (not shown) and transmitting signals from the ASICs to the motherboard. Signals from the induced charges on anode pixels 162 are used to determine any or all of the time at which a photon is detected, how much energy the detected photon deposited in the crystal and where in the crystal the photon interaction took place as is known in the art. This information is then used to reconstruct an image, for example, using the image reconstruction processor 128.

Figure 4:
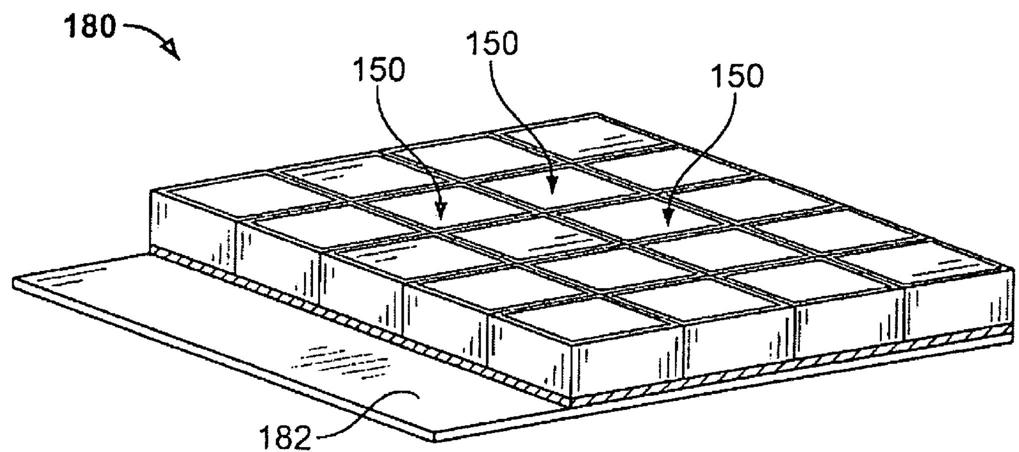
FIG. 4 is a top perspective view of a gamma camera including a plurality of pixelated photon detectors of FIG. 3.

FIG. 4 illustrates a rectangular gamma camera 180, for example, the first through N imaging detectors 102-108 (shown in FIG. 2) or the cameras 18 (shown in FIG. 1) that includes a plurality, for example, twenty pixelated detectors 150 arranged to form a rectangular array of five rows of four detectors 150. The pixelated detectors 150 are shown mounted on a motherboard 182. It should be noted that gamma cameras 180 having larger or smaller arrays of pixelated detectors 150 may be provided. One type of pixelated detector that may be used in connection with the various embodiments of the invention is described in U.S. Pat. No. 7,009,183 entitled "Pixelated Photon Detector."

In operation, the energy of a photon detected by a pixelated detector 150 is generally determined from an estimate of the total number of electron-hole pairs produced in the crystal 152 of the detector 150 when the photon interacts with the material of the crystal 152. This count is generally determined from the number of electrons produced in the ionizing event, which is estimated from the charge collected on the anode 160 of the detector 150. The energy resolution of the detector 150 is a function of how accurately the number of electron-hole pairs produced in the detector by a detected photon can be measured.

If all the electrons and holes produced by a photon detected in a the detector 150 are properly collected by the detector electrodes, then the induced charge on either the anode 160 or the cathode 156 of the detector 150 is a correct measure of the energy of the photon. However, the energy response for each pixel, and in particular, the peak position for each peak may shift in the energy spectrum for a few different reasons and affect the acquired data used to reconstruct an image. The calibration processor 138 (shown in FIG. 2) calibrates the first through N imaging detectors 102-108 by correcting for the shift in the energy peak on a pixel by pixel basis.

Figure 5:
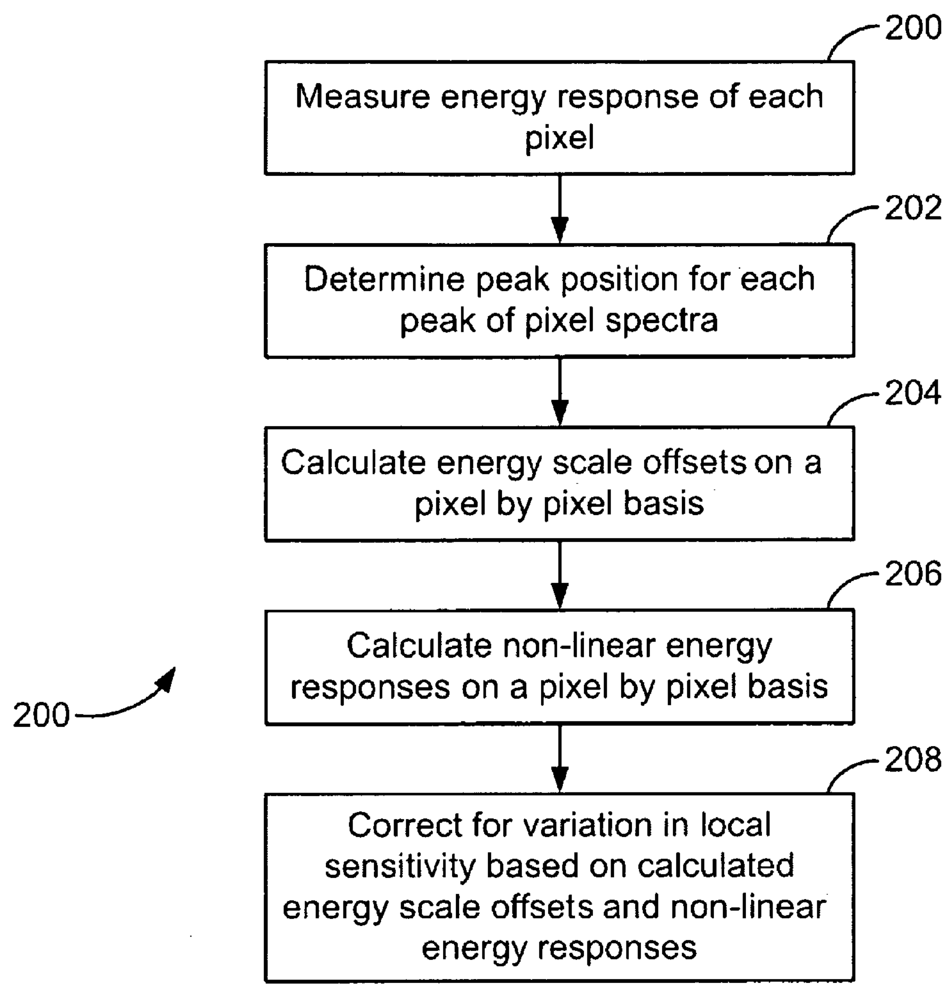
FIG. 5 is a flowchart of a method in accordance with various embodiments of the invention for calibrating semiconductor radiation detectors.

In particular, various embodiments of the invention provide a method 200 as shown in FIG. 5 for calibrating semiconductor radiation detectors, for example, pixelated gamma cameras on a pixel by pixel basis. The method 200 may be performed, for example, by the calibration processor 138 (shown in FIG. 2), and may include energy calibration and/or sensitivity calibration. Specifically, at 200, the energy response of each pixel in one or more modules (e.g., a pixelated CZT gamma camera) is measured. For example, the energy response of each pixel is measured and stored during each of a plurality of examinations, for example, patient examinations performed by a nuclear medicine imaging system. The energy response data for each pixel may be accumulated and stored over time, for example, for examinations for a single day, for a week, for several weeks, for a month, etc. However, it should be noted that the energy response data may also be stored for a short period of time for only one examination and thereafter replaced by the energy response data from the next examination.

Figure 6:
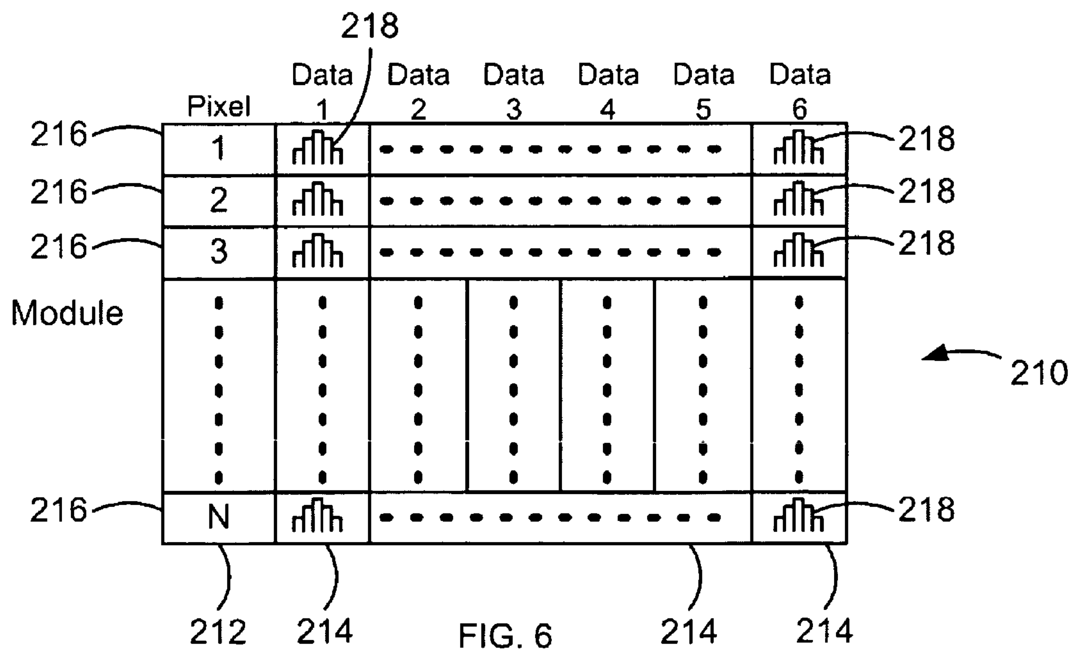
FIG. 6 is an exemplary chart illustrating energy response data that may be stored for more than one examination in accordance with various embodiments of the invention.

If energy response data is stored for more than one examination, the data may be stored on a pixel by pixel basis for each module, for example, stored in memory as illustrated by the chart 210 shown in FIG. 6. In the illustrated chart 210, the energy response data may be stored in a plurality of memory locations or addresses (that may or may not be consecutive) represented by the rows and columns of the chart 210. For example, the chart 210 may include a first column 212 identifying each pixel for an imaging module. Each successive column 214 represents energy data from different examinations, with each row 216 corresponding to the pixel for that imaging module. In operation, and for example, the energy response for each pixel may be measured by measuring a voltage at each pixel as is known. From the measured voltage, a histogram 218 of the energy response may be determined by binning each of the measured gamma detection events (e.g., coincidence events). Thus, the energy response for each pixel is measured separately and the data for one or more examinations for each pixel may be accumulated and stored.

Referring again to FIG. 5, after measuring the energy response on a pixel by pixel basis at 200, the peak position for each peak of each pixel spectra for the energy responses is determined at 202. For example, the peak positions for each peak of the uncalibrated pixel spectra are determined by peak finders. The peak finders may include any type of peak finders capable of determining the peak based on the measured energy response. For example, the peak finders may perform a parabolic fit as is known, a median calculation, use a mean in an energy window, use a Gaussian fit in an energy window, among others. However, it should be noted that other known or after developed peak finders may be used. The peak finders may be used in combination or in successive approximations to determine the peak central value, for example, using an iterative process.

It should be noted that the energy responses may be measured using a plurality of different isotopes, for example, two or three isotopes with single dominant energy emissions, such as Am241, Co57 and/or Tc99m. Alternatively, the energy response may be measured using one isotope with more than one significant energy emission such as Ga67. Alternatively the significant energy emissions can be measured from a combination of isotopes and fluorescence emission, for example, from Co57 and Lead fluorescence.

Thereafter, energy scale offsets on a pixel by pixel basis are calculated at 204 and linear and non-linear energy responses on a pixel by pixel basis are calculated at 206. For example the offset could be calculated by the pixel by pixel differences from the average value or the least value or the maximum value. Alternatively, the responses of the nuclear medicine imaging system to the two or more significant energy emissions may be fitted to a polynomial mathematical expression defined in terms of the true energies of the emissions. The polynomials may be first, second or third order polynomials to include the effects of electronic zero offsets, variable gains, and higher order non-linear responses, for example, in the clinical energy range of interest, on a pixel by pixel basis inadvertently caused by the module. Alternatively, and equivalently, the upper and lower E window edges for imaging may be calculated instead of offsets, gains, and quadratic terms or higher terms with the two or three isotopes measurements and stored. It should be noted that at 204 and 206 offsets, gains and higher order terms may be separately calculated, successively calculated, or calculated in one formulaic step, and on a pixel by pixel basis.

The calculated upper and lower E window edges may be used as specific E windows for image data collected from each pixel. The E window from both alternatives can be adjusted from the stored data to be, for example, wide for high sensitivity, or narrow for high scatter and noise rejection. The sensitivity equalization may be calculated by comparing the theoretical distribution of an isotropic source on the planar detector built on the modules. The isotropic source may be, for example, a point source located a close distance from the modules to duplicate the effect of incidence angle variation as in applications using pinhole collimators, or located a farther distance from the modules as in parallel hole collimator applications.

It should be noted that the source may be centered or off center. It also should be noted that the source may be a planar source illuminating the module unimpeded or through a parallel hole collimator or pinhole hole collimator or otherwise. It further should be noted that the theoretical distribution of the energy response may be provided in the form of a formula or a computer simulated numerical representation and estimate of the distribution or a smoothed functioned of measured data.

In some embodiments, cells corresponding to pixels that are not operating properly (e.g., intermittently operating, not operating at any time, providing unreliable data, noisy, or intermittently noisy etc.) are determined by counts relative to expectation and flagged or marked for further action, for example, interpolation in the presentation of planar views or exclusion from three-dimensional (3D) reconstruction. In 3D reconstruction, the interpolated pixels can be used to present complete detector data to reconstruction implementations that require such data or the pixels can be removed from the reconstruction process so as not to degrade the process.

Figure 7:
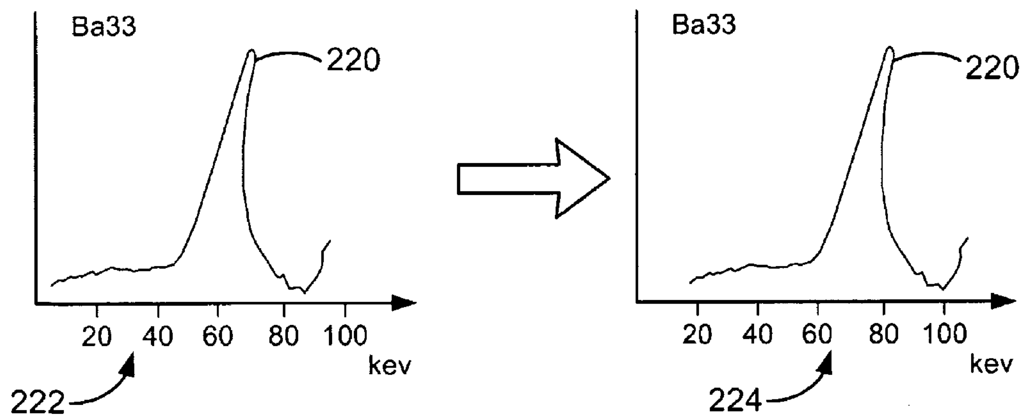
FIG. 7 is a graphical representation of the shift of an energy peak of one type of isotope in accordance with calibration methods of various embodiments of the invention.

After the energy scale offsets and linear and non-linear energy responses are calculated at 204 and 206, respectively, variations in local sensitivity are corrected at 208 based on the calculated energy scale offsets and non-linear energy responses. For example, the energy peaks for each of the pixels may be adjusted to correspond to the theoretical energy in keV by using correction factors to move the peak to the desired keV. For example, as shown in FIG. 7 the energy peak 220 of Ba33, which is offset as shown in the graph 222, may be adjusted to correct for the measured offset, such that the peak is moved to 81 keV as shown in the graph 224. It should be noted that the energy peak may be shifted by using the offset, gain and other factors as described above. It also should be noted that the sensitivity calibration at 208 also takes into account the E resolution (E res) variation and physical effects of the system (e.g., crystal deformities) as described above. It further should be noted that the E calculations generally includes determining one or more of gain, offset and quadratic term on a pixel by pixel basis.

Figure 8:
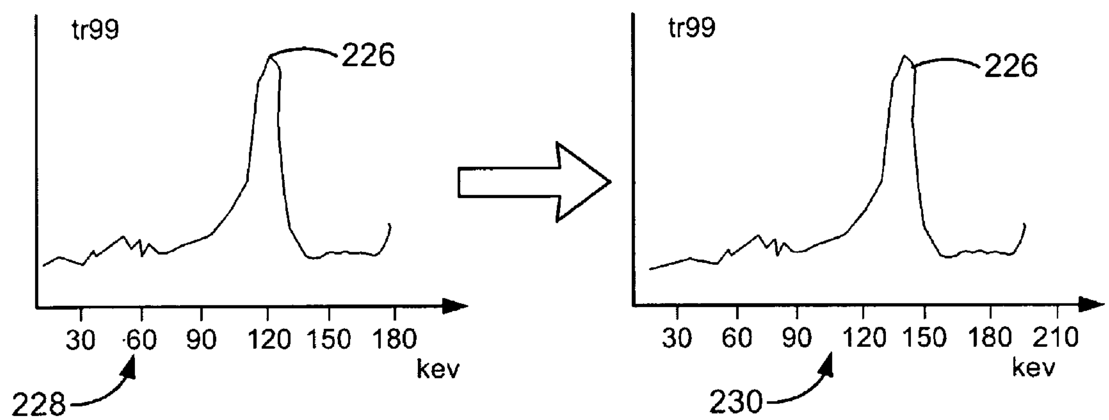
FIG. 8 is a graphical representation of the shift of an energy peak of another type of isotope in accordance with calibration methods of various embodiments of the invention.

Additionally, the method 200 may be used to calibrate semiconductor radiation detectors using isotopes other than Ba33. For example, as shown in FIG. 8, the energy peak 226 of Tc99, which is offset as shown in the graph 228, may be adjusted to correct for the measured offset, such that the peak is moved to 140.5 keV as shown in the graph 230. It should be noted that the energy peak may be shifted by using the offset, gain and other factors that are determined as described above.

Figure 9:
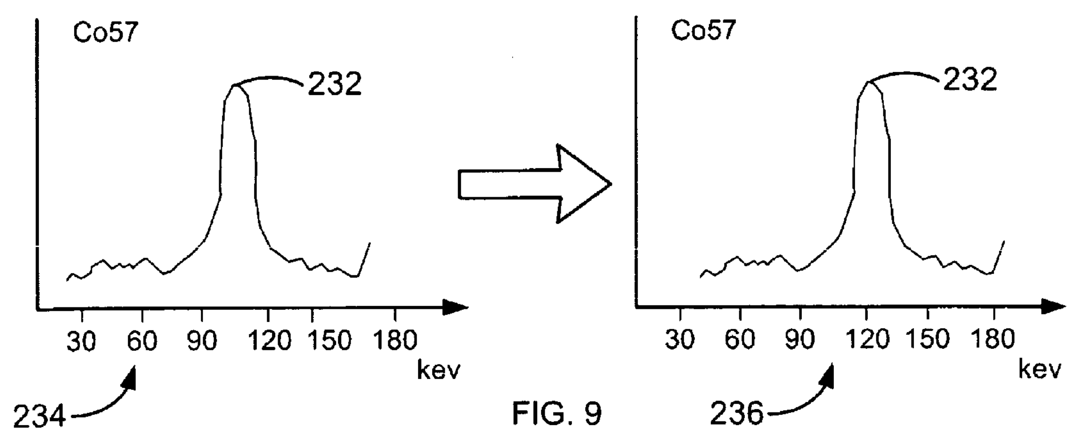
FIG. 9 is a graphical representation of the shift of an energy peak of another type of isotope in accordance with calibration methods of various embodiments of the invention.

As another example, and as shown in FIG. 9, the method 200 may be used to calibrate semiconductor radiation detectors using Co57. For example, the energy peak 232 of Co57, which is offset as shown in the graph 234, may be adjusted to correct for the measured offset, such that the peak is moved to 122 keV as shown in the graph 236. It should be noted that the energy peak may be shifted by using the offset, gain and other factors determined as described above.

It further should be noted that slow time variations in the energy response and the sensitivity response may be corrected using different methods of the various embodiments. For example, the slow time variations may be corrected using a quality control performed after a certain predetermined time period, such as after a number of examinations, each day, etc. This process may include, for example, placing a known isotope into the nuclear medicine imaging system and measuring the energy response of each pixel.

Figure 10:
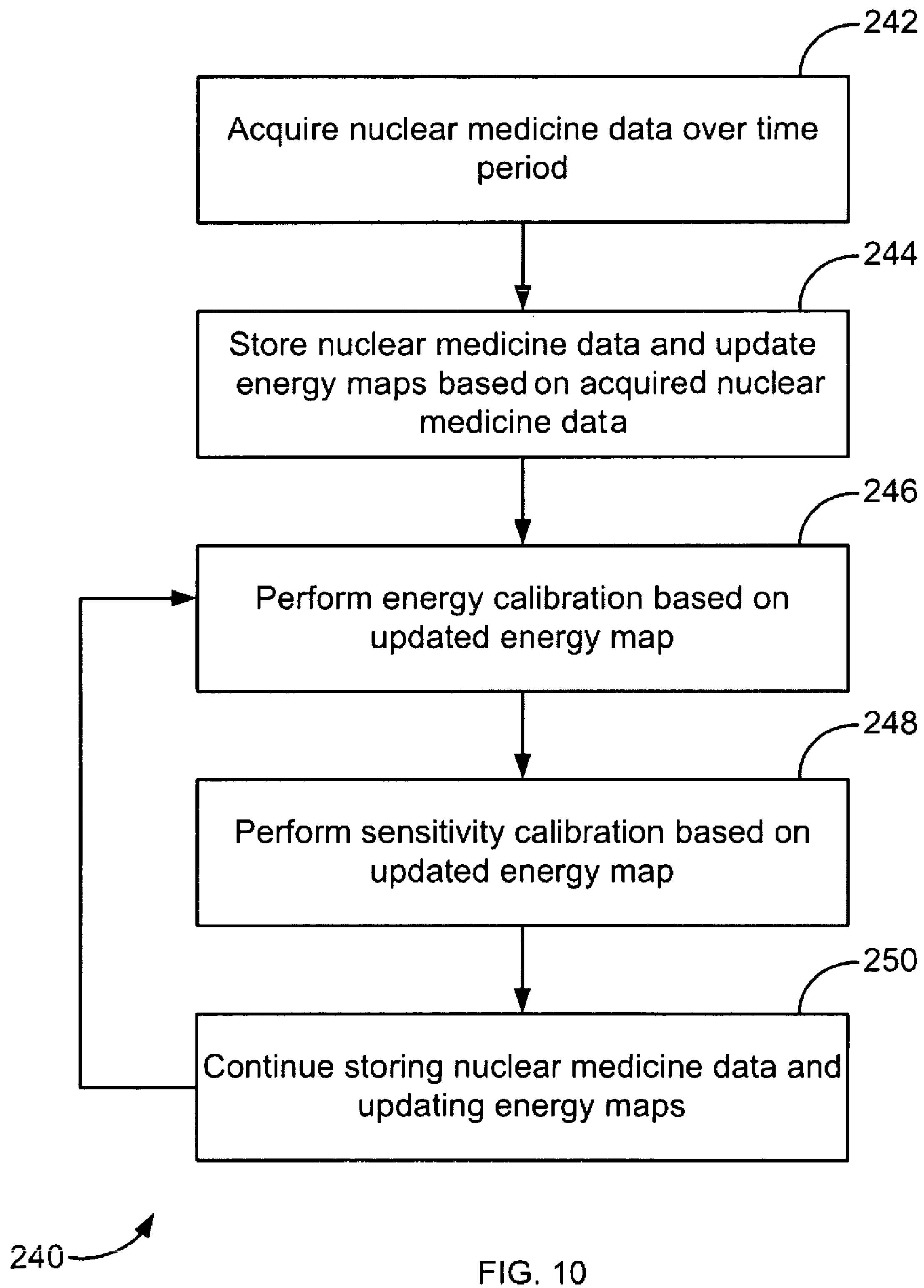
FIG. 10 is a flowchart of a method for correcting slow time variations using stored data in accordance with various embodiments of the invention.

As another example, slow time variations may be corrected using stored data, for example, the data stored in the chart 210 (shown in FIG. 6). For example, a method 240 as shown in FIG. 10 may be performed. In particular, nuclear medicine data is acquired at 242 over a time period. For example, energy response data for a plurality of examinations over a day, week, month, etc. are acquired, which may be stored and updated at 244. For example, a daily summing of energy response data for a plurality of examinations may be performed and the energy map for each pixel updated based on the data from the plurality of examinations. It should be noted that the summing may be performed after each examination, daily, weekly, etc. and is not limited to a particular time period. The update calibration may be performed by including the fresh energy peak position into a recalculation using a processor at 206 and two older energy peaks. Alternatively, updates to only one of the calibration parameters may be calculated, for example, the offset.

Thereafter, energy calibration based on the updated energy map may be performed at 246 and sensitivity calibration based on the updated energy map may be performed at 248, for example, as described in more detail above. The calibration may include, for example, correcting for identified isotope peak changes in each pixel or the E windows or the correction factors may be adjusted for the measured change. In some embodiments, the offset term of the polynomial response described above is adjusted to correct the peak and make the sensitivity map usable again. Alternatively, or in other embodiments, the factor in the sensitivity map that depends on how the E window cuts the E spectral peak can be recalculated and then combined with the factor representing the non-changing geometrical aspects of the factorized sensitivity map.

Nuclear medicine data is continually or periodically stored at 250 and the calibrations at 246 and 248 may again be performed at certain time intervals. For example, the calibrations may be performed after a predetermined number of examinations, a predetermined number of updates, a predetermined time period, as needed, as desired, etc.

As still another example, slow time variations may be corrected by correcting the peak position by recalculation with a mixture of old and new data sets. For example, if needed, the sensitivity map can be factored into a fixed physical component and a spectral peak dependent part at the time the sensitivity map is first generated. Thereafter, new spectral components can be updated anytime spectral data is acquired. Sensitivity maps may be factored into components. One component is the ratio of sensitivity at one energy to the sensitivity at another energy. One component is the variation pixel to pixel caused by differing E resolutions (E res). The last component is the fixed variation due to mechanical factors such as pixel electrodes layout, variable edge finish, etc.

In the various embodiments, a correction map may be formed from a plurality of maps, for example, by multiplying a plurality of maps. Accordingly, the correction map (Map- Total[{x, y},{conditions}) is formed by the multiplication of a plurality of maps. For example:

if {Conditions} are {e, de, c}

{x,y} are the pixel coordinates;

then,

{Conditions}={e, de; c} is generally the measurement condition, wherein e is the energy;

de is the energy window width; and c is the collimator.

However, it should be noted that more factors such as temperature may be included in the {conditions}. For example the energy related map is of the form MapEnergy [(e), {x,y)]. This map gives the response of each pixel at energy "e" ("e" is used here as a "parameter"; and {x,y}—as variables). For each isotope (or isotope emission peak, if a multi-peak emission) there is a map. Similarly, there is a collimator map for each isotope. It also should be noted that some maps may depend on more than one "condition". For example, the energy map may be of the form MapEnergy[(e, de), {x,y)] and the collimator map may be of the form MapCollimator[(e,c), {x,y)]. Accordingly, a correction map may be determined as follows:

$$\text{MapTotal}[\{x,y\},(\text{specific condition})]=\text{MapEnergy}[\{x,y\},(e)]*\text{MapCollimator}[\{x,y\},(c)]* \ldots$$

Moreover, the calibration measurements become simpler because fewer measurements are needed to establish each of the few (versus measuring a map for each and every condition).

At least one technical effect of some of the embodiments is higher clinical accuracy and reduced cost and frequency of service by improving the system stability. Another technical effect of at least some embodiments is the efficient use of patient radiation data that can reduce the imaging time and thereby the operating costs. Alternatively the radiation dose given to patients also may be reduced without increasing the imaging time or detector active area. The improved accuracy in the measured energy of the incident radiation can be used to allow simultaneous dual isotope imaging, such as from Tl201 and Tc99m or I123 and Tc99m both circulating systemically in the patient at the same time and differentiated in the image by the different and sufficiently resolved energy measurements for each of the isotopes. The improved pixilated response also provides an image quality improvement to low energy isotopes such as Tl201 used in cardiac imaging. The Spatial resolution and the image spatial linearity will be the same as for the images generated from Tc99m and compared to determine the specific cardiac physiology. With semiconductor radiation detectors, segmentation of one area of the image from one isotope can be applied to the image of a second isotope. Also, a region of interest (ROI) on one image can be matched and inspected on the second image. Image comparison by co-display either side by side or superimposed or differenced or ratioed may be provided. Additionally, in conjunction with the use of the radio-labeled tracer mIBG, areas of the myocardium that are innervated (with viable nervous system) can be correlated with the more common images of blood perfusion in a meaningful way and as a criteria in a clinical diagnoses. The images also may be used to detect submyocardial disease.

It should be noted that the various embodiments of the invention may be implemented entirely in software on general purpose computers. In other embodiments, a combination of a software and hardware implementation may be provided.

It should be noted that the various embodiments may be implemented on any type of imaging system. For example, the various embodiments may be implemented in a SPECT scanner that includes ten CZT detectors arranged in the form of a cylinder. The collimator used in may be for example a pinhole, slit-hole, parallel, fan-beam, cone-beam, etc. Also, the various embodiments may be implemented in connection with a stationary or moving detector with a stationary or moving collimator. The collimator may move with the detector or separately.

Some embodiments of the present invention provide a machine-readable medium or media having instructions recorded thereon for a processor or computer to operate an imaging apparatus to perform one or more embodiments of the methods described herein. The medium or media may be any type of CD-ROM, DVD, floppy disk, hard disk, optical disk, flash RAM drive, or other type of computer-readable medium or a combination thereof.

The various embodiments and/or components, for example, the processors, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, the ordering of steps recited in a method need not be performed in a particular order unless explicitly stated or implicitly required (e.g., one step requires the results or a product of a previous step to be available). While the dimensions and types of materials described herein are intended to define the parameters of the invention, they are by no means limiting and are exemplary embodiments. Many other embodiments will be apparent to those of skill in the art upon reviewing and understanding the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for calibrating a pixelated semiconductor radiation detector, the method comprising:

acquiring energy response data for a plurality of pixels of the pixelated semiconductor radiation detector; and performing at least one of energy calibration and sensitivity calibration on each of the plurality of pixels based on the acquired energy response data, and calculating an energy response on a pixel by pixel basis.

2. A method in accordance with claim 1 further comprising determining a peak position for each peak of a pixel spectrum for each of the plurality of pixels.

3. A method in accordance with claim 1 wherein performing the energy calibration comprises calculating an energy offset on a pixel by pixel basis.

4. A method in accordance with claim 1 wherein performing the sensitivity calibration comprises calculating a linear or non-linear energy response on a pixel by pixel basis.

5. A method in accordance with claim 1 wherein performing at least one of energy calibration and sensitivity calibration comprises correcting for a variation in the energy response data from a known response.

6. A method in accordance with claim 1 wherein performing at least one of energy calibration and sensitivity calibration comprises generating a sensitivity map.

7. A method in accordance with claim 6 wherein performing at least one of energy calibration and sensitivity calibration comprises factoring the sensitivity map into one of a ratio of sensitivity at one energy to a sensitivity at another energy, a variation pixel to pixel caused by differing E resolutions and a fixed variation due to mechanical factors including at least one of pixel electrodes layout and variable edge finish.

8. A method in accordance with claim 1 further comprising storing the energy response data on a pixel by pixel basis for a plurality of examinations.

9. A method in accordance with claim 1 further comprising storing the energy response data on a pixel by pixel basis for a time period.

10. A method in accordance with claim 1 further comprising storing the energy response data on a pixel by pixel basis and updating energy maps for each of the plurality of pixels based on the stored energy response data.

11. A method in accordance with claim 10 wherein the updating comprises summing the stored energy response data.

12. A method in accordance with claim 11 wherein the stored energy response data comprises energy response data for a plurality of examinations.

13. A method in accordance with claim 11 wherein the stored energy response data comprises energy response data from a single day.

14. A method in accordance with claim 10 wherein the updating is performed after a predetermined number of examinations.

15. A method in accordance with claim 10 wherein the updating is performed once a day.

16. A method in accordance with claim 1 wherein acquiring energy response data comprises one of measuring an energy response of a plurality of isotopes each having a single dominant energy emission and measuring an energy response of one isotope having more than one significant energy emission.

17. A method in accordance with claim 16 wherein the plurality of isotopes comprise at least two of Am241, Co57 and Tc99m.

18. A method in accordance with claim 16 wherein the one isotope having more than one significant energy emission comprises Ga67.

19. A method in accordance with claim 1 further comprising identifying any noisy pixels based on the acquired energy response data.

20. A method in accordance with claim 19 further comprising one of interpolating in a presentation of planar views and excluding from three-dimensional (3D) reconstruction the identified noisy pixels.

21. A non-transitory machine readable medium or media having recorded thereon instructions configured to instruct an apparatus comprising a computer or processor, memory, and a display, to:

acquire energy response data for a plurality of pixels of a pixelated semiconductor radiation detector; and perform at least one of energy calibration and sensitivity calibration on each of the plurality of pixels based on the acquired energy response data and update energy maps for the plurality of pixels based on the energy response data.

22. A machine readable medium or media in accordance with claim 21 wherein the energy response data is stored in the memory.

23. A machine readable medium or media in accordance with claim 22 wherein one of the energy calibration and sensitivity calibration is performed at time intervals and based on the stored energy response data.

24. A diagnostic imaging system comprising:

at least one pixelated detector including a plurality of pixels and configured to acquire photon data; and a calibration processor configured to acquire energy response data for a plurality of pixels of the pixelated semiconductor radiation detector and perform at least one of energy calibration and sensitivity calibration on each of the plurality of pixels based on the acquired energy response data, including calculating an energy response on a pixel by pixel basis.

* * * * *